J. M. MACK.
STEERING MECHANISM FOR AUTOMOBILES.
APPLICATION FILED NOV. 27, 1905.
904,137.
Patented Nov. 17, 1908.
3 SHEETS—SHEET 1.
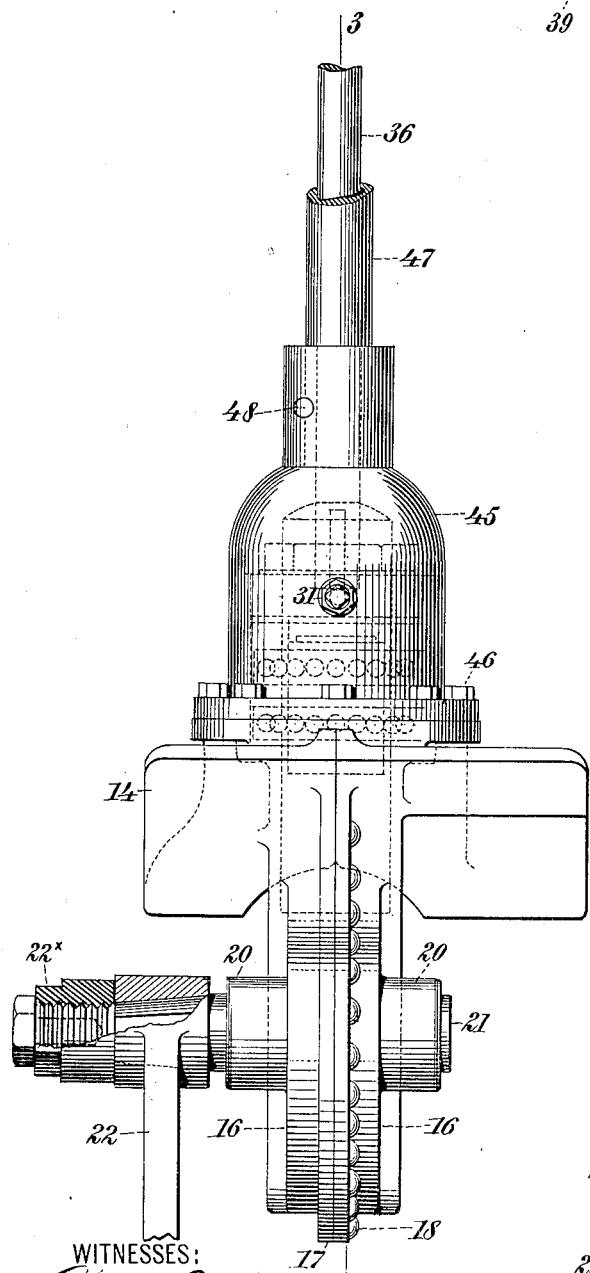
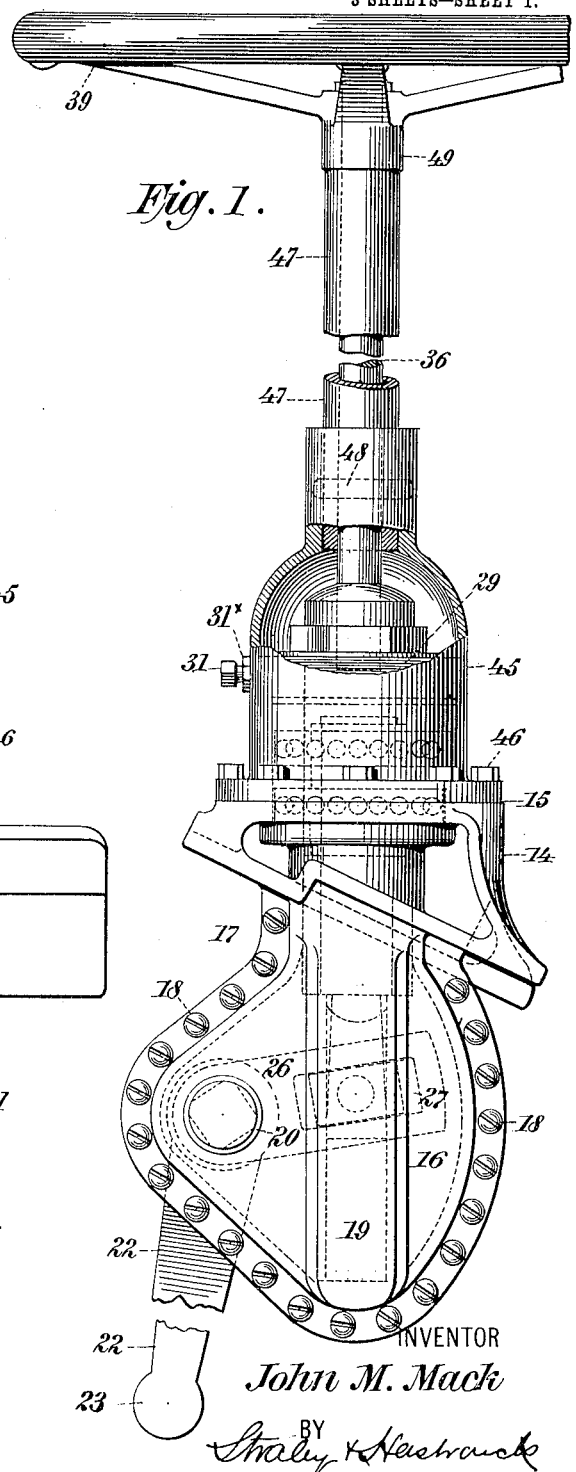
INVENTOR
John M. Mack
BY
Straley & Hasbrouck
his ATTORNEYS

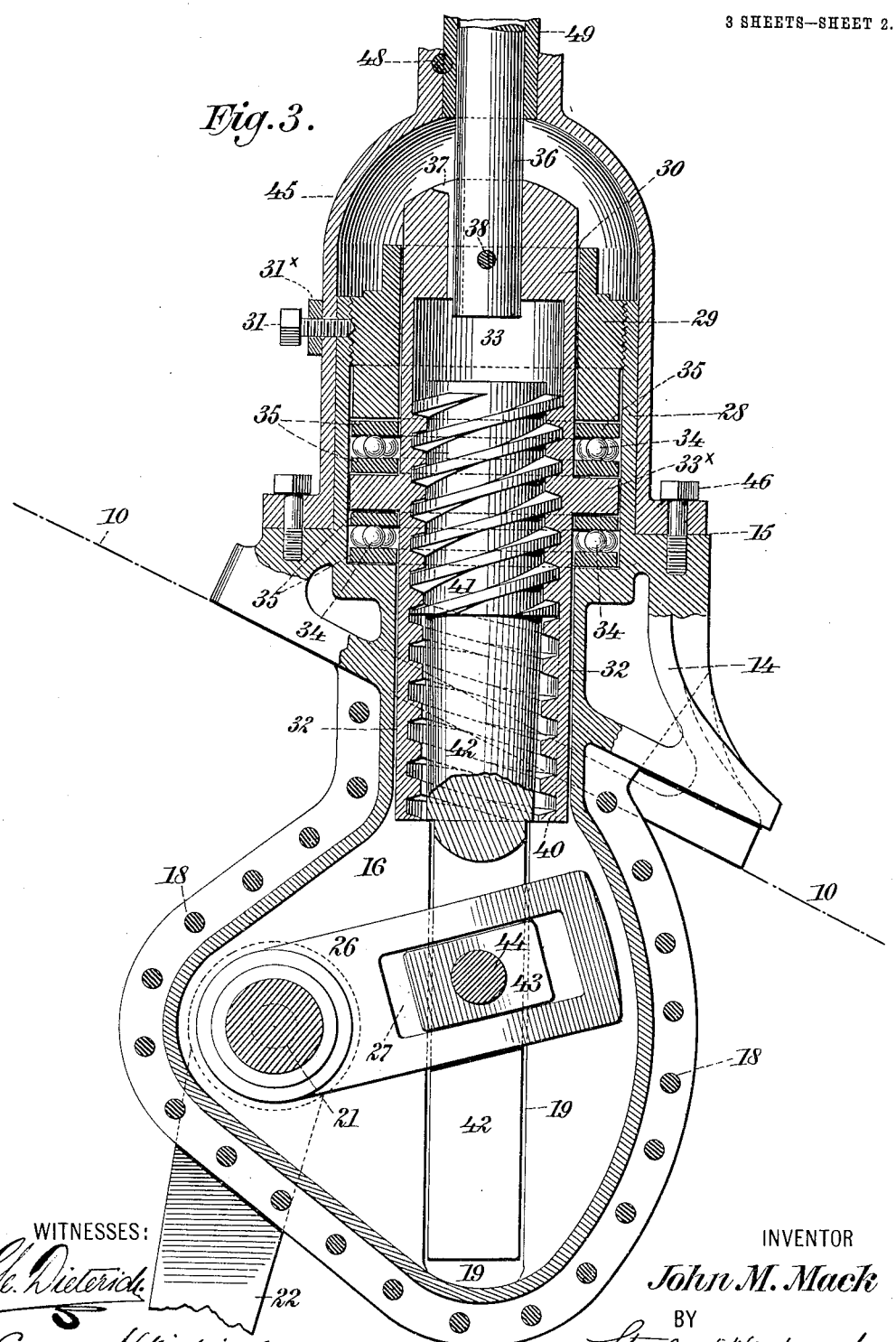

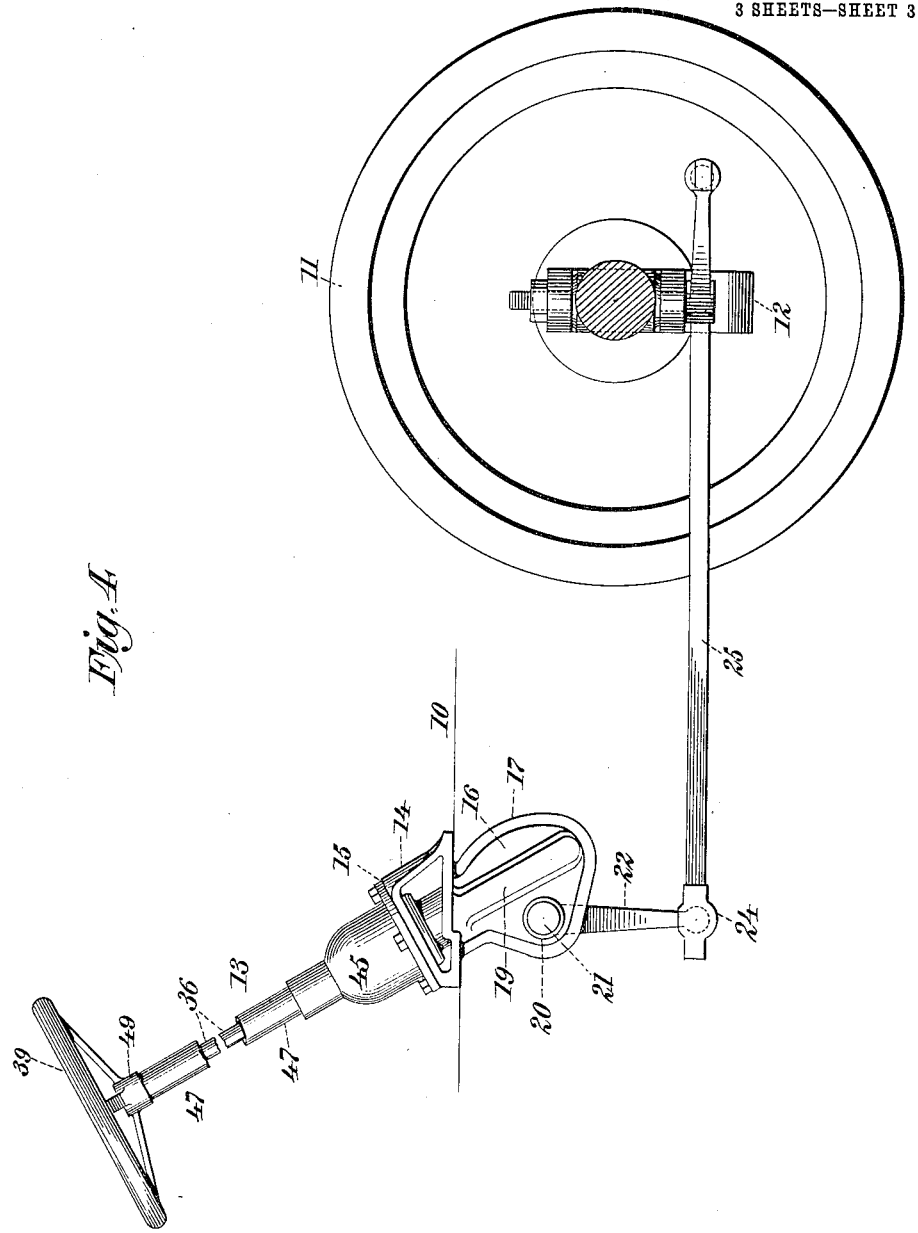

UNITED STATES PATENT OFFICE.

JOHN M. MACK, OF ALLENTOWN, PENNSYLVANIA.

STEERING MECHANISM FOR AUTOMOBILES.

No. 904,137.  Specification of Letters Patent.  Patented Nov. 17, 1908.

Application filed November 27, 1905. Serial No. 289,143.

To all whom it may concern:

Be it known that I, JOHN M. MACK, a citizen of the United States, residing at Allentown, Lehigh county, in the State of Pennsylvania, have invented certain new and useful Improvements in Steering Mechanism for Automobiles, of which the following is a full, clear, and exact specification.

My invention relates to improvements in steering means for motor vehicles, and the same has for its object more particularly to provide a simple, efficient and durable steering mechanism adapted for motor vehicles of all types, and more especially for heavy or commercial vehicles.

Further said invention has for its object to provide a steering mechanism by means of which a small partial revolution of the steering wheel in either direction will suffice to enable the operator to perform and control the usual steering movements of the vehicle, and by means of which a complete revolution of the steering wheel in either direction will be sufficient to actuate the steering gear and connected parts to the extreme limits of its movements.

To the attainment of these objects, my invention consists in the novel details of construction, and in the combination, connection and arrangement of parts hereinafter more fully described, and then pointed out in the claims.

In the accompanying drawings forming part of this specification, wherein like numerals of reference indicate like parts, Figure 1, is a side view, partly broken away, showing a steering post made according to and embodying my said invention; Fig. 2, is a front view of the same with the upper portion of the rod and hand wheel broken away; Fig. 3, is an enlarged detail section of the casing and operating parts therein, taken on the line 3—3 of Fig. 2, and Fig. 4, is a diagrammatic side view, partly in section, showing a portion of a motor vehicle with my steering mechanism applied thereto.

In said drawings 10 designates the vehicle frame, 11 the front wheel, and 12 the axle upon which the front wheels are mounted by means of knuckle joints of ordinary construction.

13 denotes the steering post which is secured upon the frame 10, and comprises a base or pedestal 14 having an inclined top 15. The base or pedestal is composed of two parts or halves each having one part or half 16 of a quadrant-shaped casing 17 depending from its under-side, which parts or halves 16 are adapted to be secured together along their edges by bolts or nuts 18. In the opposing inner surfaces of the casing parts 16 are provided vertical recesses or guides 19, 19 and upon the outer surface of the casing 17 adjacent to the rear ends of the parts or halves 16, 16 are provided outwardly projecting hubs or bosses 20 20, which are provided with apertures and serve as bearings for a shaft 21. The longer projecting end of the shaft 21 is tapered and square, and its extreme end provided with screw-threads. Upon said end of the shaft 21 is fitted one end of an arm 22 which is secured in position thereon by a nut $22^x$. The lower end of said arm 22 terminates in a rounded portion or head 23 adapted for engagement with a socket member 24 of a connecting rod 25, whose other end is pivotally connected with the steering gear of the front wheels, and upon the portion of the shaft 21 within the casing 17 is fixed (at about right angles to the arm 22) an arm 26 having a longitudinal slot 27 therein. From the upper side of the base 14 projects a tubular or sleeve portion 28 having screw-threads upon its inner surface adjacent to its upper edge, and adapted to receive an adjusting nut 29 having a circular opening 30 therein.

31 denotes a screw extending through the housing 44 and adapted to engage and hold the adjusting nut 29, and $31^x$ denotes a lock nut arranged upon said screw 31.

32 denotes a circular passage or opening extending from the base 14 downwardly to the upper end of the casing 17, and 33 a sleeve having its lower portion fitted into said circular passage or opening 32 and its upper end extending into and guided within the opening 30 in the adjusting nut 29. Upon the outer surface of the sleeve 33 intermediate the base 14 and the adjusting nut 29 is provided a lateral flange or collar $33^x$ above and below which are disposed ball bearings 34 arranged intermediate annular plates 35, 35. Within the upper closed end of the sleeve 33 is secured the lower end of a steering rod 36 which is held therein so as to rotate with said sleeve by a key 37, and against longitudinal movement by a pin 38. 39 denotes a steering wheel which is secured to the upper end of the steering rod 36, and 40 denotes screw threads provided upon the inner surface of the sleeve 33.

41 denotes a screw working within the threaded sleeve 33 having its lower end 42 bifurcated and embracing the arm 26 fixed upon the shaft 21. Arranged intermediate the end of the bifurcated portion 42 of the screw 41 and within the recess 27 of the arm 26 is a block 43 which is pivotally secured in position upon a cross-pin or pivot 44 extending through the ends of the bifurcated portion. The said recess 27 being sufficiently large to accord full play to the block 43 during the movement of the arm 26.

45 denotes a housing which is secured by bolts 46 to the upper side of the base or pedestal 14, and incloses the upper part of the sleeve 28 and parts therein, and 47 denotes a tube which surrounds the steering rod 36 and is secured at its lower end within the top of the housing 45 by a pin 48, and has its other end extending upward and into a socket 49 provided on the underside of the steering wheel 39.

It is to be noted that in my improved construction the full thread of the screw 41 is at all times in engagement with the interior thread of the sleeve 33 thus distributing the wear evenly over both parts, and preventing the undue wear of portions of either, and that by reason of the arrangement and construction of parts a slight movement of the steering wheel is sufficient to enable the operator to perform all the usual or ordinary steering operations, and a complete turn of the wheel enables the operator to actuate the steering gear to the extreme limits of its movements in either direction.

Without limiting myself to the precise details of construction, which may be varied within the scope of the invention,

What I claim and desire to secure by Letters Patent is:

1. A steering apparatus for vehicles comprising a casing, a shaft supported partly within and partly without said casing, an arm fixed upon said shaft without the casing adapted for connection with the steering gear, an arm fixed upon said shaft within said casing, a movable member having a bifurcated end adapted for sliding engagement with said arm, and a threaded end, means for guiding said movable member, a sleeve inclosing the end of said movable member and provided with screw threads adapted to engage the threaded end of said movable member, an annular support arranged upon said sleeve intermediate its ends, bearings disposed above and below said support, and a rod secured at its lower end to said sleeve and provided at its upper end with a hand wheel for actuating said rod and its connected parts, substantially as specified.

2. A steering apparatus for vehicles, comprising a casing, a shaft supported therein, an arm fixed upon said shaft adapted for connection with the steering gear, an arm fixed upon said shaft within said casing, guides in said casing a movable member adapted to work in said guides having a bifurcated portion and in sliding engagement with the arm arranged within the casing upon said shaft, and the upper end with a threaded portion, a sleeve revolubly arranged in said casing and inclosing the threaded end of said movable member, and provided with screw threads engaging those of said movable member, a collar on said sleeve, anti-friction bearings arranged in the casing above and below said collar, an adjusting nut secured in the upper end of said casing and surrounding the revoluble sleeve therein, and a rod secured at one end to said revoluble sleeve, and provided at its other end with a steering wheel, substantially as specified.

3. A steering apparatus for vehicles comprising a casing consisting of a base having a tubular portion thereon, and a segmental shaped portion depending from said base, guides arranged in said segmental portion, a shaft in said casing having an arm fixed upon said shaft adapted for connection with the steering gear, an arm fixed on said shaft within the casing, a recess in said arm, a screw having a bifurcated lower end adapted to work in the guides aforesaid, a pivot extending through said bifurcated portion, a block carried upon said pin and adapted to work within the recess in the arm aforesaid, a sleeve disposed within the tubular portion of said casing having a collar thereon, ball bearings disposed above and below said collar, an adjusting nut having an opening therein to receive the upper end of said sleeve working in the tubular portion of said casing, screw threads upon the inner surface of said sleeve adapted to engage the screw aforesaid, a rod secured at one end to said sleeve and provided at its other end with a steering wheel, a housing inclosing the tubular portion of said casing, and a tube surrounding said rod and having its lower end secured to the housing, substantially as specified.

Signed at the city of New York, in the county and State of New York, this twenty-first day of November, nineteen hundred and five.

JOHN M. MACK.

Witnesses:
C. A. DIETERICH,
JOSEPH G. QUINN, Jr.